Figure 1:
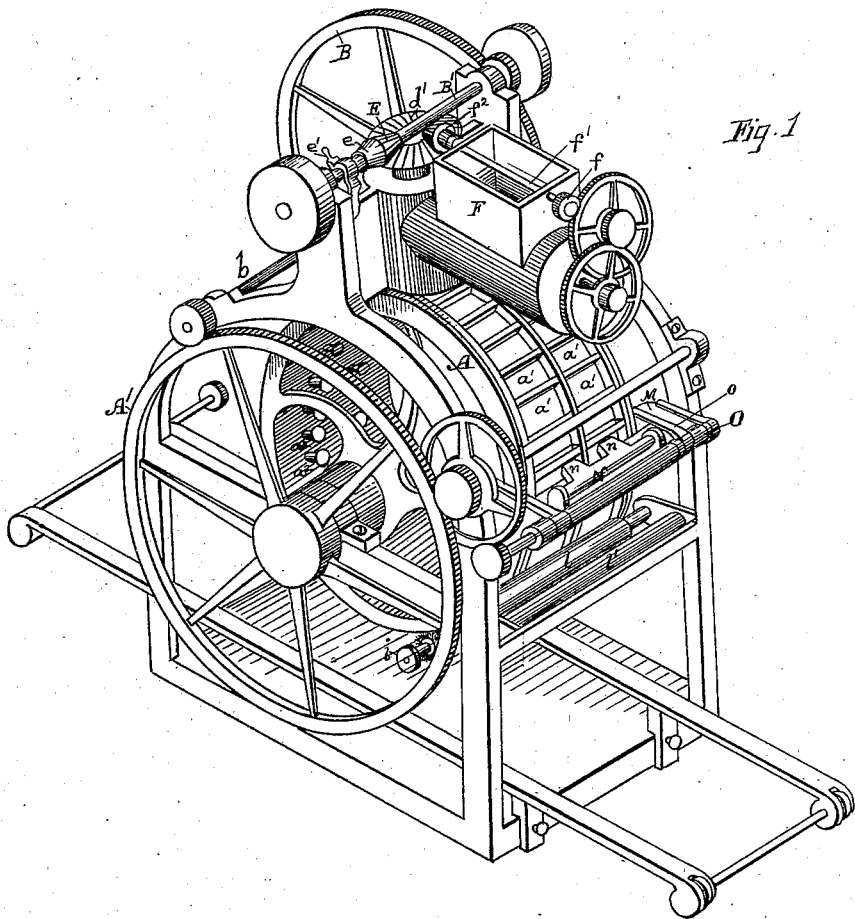

(No Model.) 2 Sheets—Sheet 1.

W. H. WIESTER.
Sugar Molding Machinery.

No. 231,638. Patented Aug. 24, 1880.

Witnesses
Geo. H. Strong
Frank A. Brooks

Inventor
William H. Wiester
By Dewey & Co.
Attys (No Model.) 2 Sheets—Sheet 2.
W. H. WIESTER.
Sugar Molding Machinery.
No. 231,638. Patented Aug. 24, 1880.
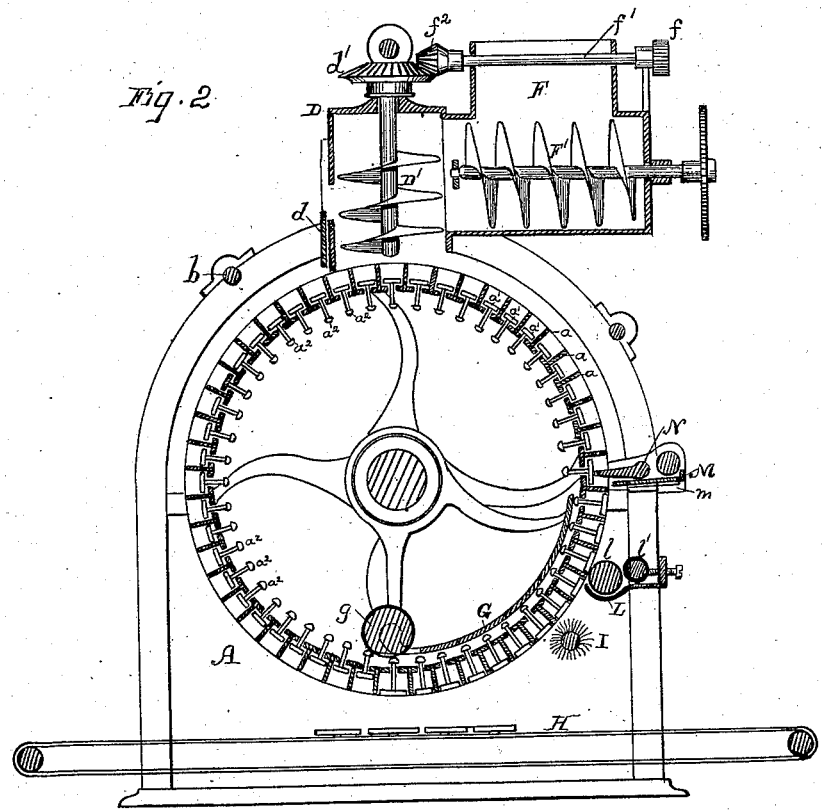
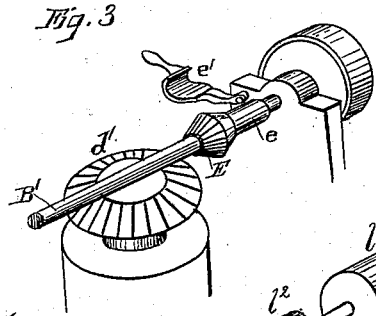
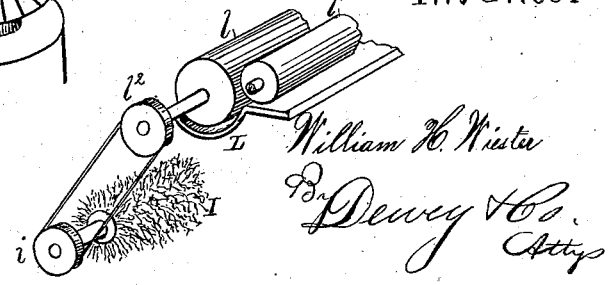
Witnesses
Frank A. Brooks
Geo. H. Strong
Inventor
William H. Wiester
By Dewey & Co.
Attys

UNITED STATES PATENT OFFICE.

WILLIAM H. WIESTER, OF SAN FRANCISCO, CALIFORNIA.

SUGAR-MOLDING MACHINERY.

SPECIFICATION forming part of Letters Patent No. 231,638, dated August 24, 1880.

Application filed April 14, 1880. (No model.)

*To all whom it may concern:*

Be it known that I, WILLIAM H. WIESTER, of the city and county of San Francisco, and State of California, have invented an Improvement in Sugar-Molding Machinery; and I hereby declare the following to be a full, clear, and exact description thereof.

My invention relates to certain improvements in that class of sugar-molding machines in which the molds are placed on the periphery of a revolving wheel.

My improvements consist in certain combinations of devices, as hereinafter fully described and specifically claimed.

Figure 1 is a perspective view of my machine. Fig. 2 is a longitudinal vertical section of the same. Figs. 3 and 4 are details of construction.

The mold-wheel A is mounted on a shaft on the frame, and is driven by the spur-wheel A' and pinion on the counter-shaft $b$, which has a gear, B, meshing with a pinion on the driving or belt shaft B', as shown. This mold-wheel A is provided with molds $a$, arranged in a circle on the periphery of the wheel, each separate mold having a sliding bottom, $a'$, having a rearwardly-extending stem, $a^2$, as shown, these sliding bottoms pushing the molded sugar out of the molds onto the drying-plates, in the manner hereinafter described.

Immediately over the mold-wheel is a cylindrical feed-box, D, having a regulating-gate, $d$, and inside of this feed-box is a vertical pressing-screw, D', which is rotated by a horizontal gear, $d'$, meshing with the sliding pinion E. This pinion on the shaft B' is on a sleeve, $e$, which sleeve is held forward by the movable collar $e'$, so as to keep said pinion E in mesh with the gear $d'$ to rotate the feed-screw; but when cleaning the mold-wheel this collar $e'$ may be lifted and the sleeve and pinion E moved back, so that the feed-screw is not operated by the feather on the driving-shaft.

Connected with the feed-box is a hopper, F, carrying a horizontal feed-screw, F', which is operated by a suitable gearing from a pinion, $f$, on the shaft $f'$, this shaft having at its opposite end a pinion, $f^2$, meshing with the horizontal gear $d'$, which drives the vertical pressing-screw. This feed-screw is therefore also made idle when the sliding pinion E on the shaft B' is disengaged from the gear $d'$ as hereinbefore described.

The sugar to be molded comes from above into the hopper F, and the feed-screw F' feeds it along into the feed-box D. Here it is taken by the pressing-screw D' and delivered to the molds on the wheel below the feed-box. This presser-screw forces the sugar into the molds with considerable pressure, so as to compact it into the desired form. The gate $d$ in the feed-box may be moved up or down to regulate this pressure and relieve the screw, since if the feed-box becomes filled too much and too much pressure is exerted by the screw, the gate may be opened more or less to suit circumstances, and some of the sugar may escape through the gate and not be forced into the mold. This gate is set at a certain point, and if the sugar is compacted too much part of it will pass out of the gate and be led off by a suitable trough. If the sugar is not compacted sufficiently the gate is raised suitably. This gate really answers as a vent to obviate any danger of breakage, and also serves as a means by which the screw can be cleaned. It is not necessary to move the gate frequently. Once set properly it will remain so for a long time.

As the mold-wheel is revolved, and the molds on the upper side become filled with sugar, in the manner described, those molds below are emptied of their cubes of sugar. To accomplish this I place inside the wheel a plate, G, hanging from the central shaft by suitable arms, as shown, and on the front edge of this plate G is a roller, $g$. As the mold-wheel revolves, the stems $a^2$ of the sliding mold-bottoms come in contact with the roller. This contact pushes the bottoms out flush with the edges of the molds, the formed cubes in the molds being thus pushed out onto suitable drying-plates on the endless belt H under the mold-wheel. This endless belt carries the drying-plates and molded cubes of sugar to the drying-room, where the plates and their contents are removed and set on suitable racks, where the cubes are dried.

It now becomes necessary, before the molds come in the revolution of the wheel under the presser-box to be again filled, to cleanse them and remove from the molds and sliding bottom any adhering particles of sugar. The sliding bottoms, as they come out to the front edge of the molds, as described, themselves clean the sides of the molds by pushing the particles before them. These bottoms are held flush with the edges of the molds by the curved plate G, preventing their stems being pushed back when the bottoms themselves are brought in contact with the revolving brush I. This revolving brush I is rotated with its shaft by a pulley, $i$, suitably connected with the operating mechanism. The rotation of the brush removes any loose particles of sugar on the faces of the sliding bottoms and on the edges of the molds.

In pressing newly-made and moist sugar in this manner I find, however, that the simple brushing, while it will remove the loose particles, will not entirely remove the sticky substance which accumulates on the molds and bottoms, and a still further cleansing of said molds and bottoms is therefore necessary. To accomplish this I place just above the brush a little reservoir or basin, L, for water, in which is a roller, $l$, covered with woolen material. Behind this roller is another one, $l'$, covered with rubber, similar to those used on clothes-wringing machines, and arranged to be adjustable with relation to the woolen-covered roller. The rotation of both these rollers is insured by the pulley $l^2$ on the end of the roller $l$, from which a belt runs to a corresponding pulley on the revolving brush-spindle. The roller $l$ has its lower edge continually in the water in the basin L, and is therefore wet; but the superfluous water is squeezed from the woolen material by the pressure of the rubber roller. When the woolen material reaches the faces of the sliding bottoms and edges of the molds of the mold-wheel, against which it is intended it shall impinge, said roller is only damp enough to wipe off any sticky substance adhering to the molds and bottoms, leaving them clean and bright and ready for the reception of the next charge when reaching the presser-box above.

Just above the woolen roller is a sliding plate, M, moving in guides $m$, and carrying a hinged bar, N, with projections $n$, corresponding in number to the number of molds in a cross-section of the mold-wheel. A cam-shaft, O, suitably geared to the spur-wheel A, has rods $o$, hinged to the sliding plate M, so that this sliding plate has a reciprocating motion imparted to it. As each series of plates, therefore, comes in front of the hinged bar N in said sliding plate, the projections on said bar, by striking against the faces of the sliding bottoms, push said bottoms back into place, leaving the molds free and ready to receive their charges when coming under the presser-box.

In this way the molds are filled, their contents discharged in molded form onto the plates on the belt delivering them to the drying-room, the loose particles of sugar are pushed off, the molds are washed, and their sliding bottoms pushed back in place ready to receive their next charge. This operation is rapid and continuous and automatic, requiring no attention or skill on the part of the attendants.

When at any time it becomes necessary to more thoroughly wash and clean the mold-wheel the feed-screw and presser-screw are thrown out of gear, and the mold-wheel rotated. The molds and bottoms are then repeatedly brushed and washed without the necessity of running the whole piece of machinery.

I am aware that sugar-molding machines have been heretofore made with screw devices for feeding the sugar to molds located in the periphery of a revolving wheel and provided with devices for automatically emptying and cleansing the molds. Hence I make no broad claim to any of the agencies named.

Having thus described my invention, what I claim as new, and desire to secure by Letters Patent, is—

1. In combination with a revolving sugar-molding wheel provided with automatic brushing and washing devices for cleansing the molds, the feed and pressing screws F' D', with their gears and pinions $d'$ $ff^2$, and the sliding pinion E, with its sleeve $e$, on the driving-shaft B', said sleeve having an adjusting-collar, $e'$, whereby the mold-wheel may be cleansed at will without any material being fed to the mold, and without operating said feed and pressing screws, substantially as and for the purpose herein described.

2. In combination with a rotating sugar-molding wheel, A, having molds $a$, the water-basin L, with its washing-roller $l$ and squeezing-roller $l'$, whereby all sticky substances are automatically removed from the molds, substantially as and for the purpose herein described.

3. In combination with a rotating sugar-molding wheel, with molds $a$, having sliding bottoms $a'$, the rotating dry-brush I, reservoir L, and the washing-roller $l$, whereby the molds are automatically both swept and washed at each revolution of the wheel, substantially as and for the purpose herein described.

4. In combination with a sugar-molding wheel, A, provided with molds $a$, having sliding bottoms $a'$, forced out by their stems $a^2$ coming in contact with a roller, $g$, the rocking bar N, having projections for forcing said bottoms back to their places, substantially as and for the purpose herein described.

5. In combination with a sugar-molding wheel, A, provided with molds $a$, having sliding bottoms $a'$ and stems $a^2$, the stationary plate G, with its roller g, the revolving brush I, washing-roller l, and reciprocating bar N, with projections corresponding to the position of the molds on the revolving wheel, whereby the sliding mold-bottoms are forced out to deposit their cubes, held out while being brushed and washed, and again returned to their positions to receive the next charge, substantially as and for the purpose herein described.

In witness whereof I have hereunto set my hand.

W. H. WIESTER.

Witnesses:
 J. H. BLOOD,
 S. H. NOURSE.